United States Patent
Fox et al.

(10) Patent No.: US 12,189,803 B2
(45) Date of Patent: Jan. 7, 2025

(54) BOUNDARY BASED EDGE DEVICE COMPLIANCE PROGRAM FOR MANAGING END USER DATA COMPLIANCE

(71) Applicant: INTERNATIONAL BUSINESS MACHINES CORPORATION, Armonk, NY (US)

(72) Inventors: Jeremy R. Fox, Georgetown, TX (US); Grant Douglas Miller, Arvada, CO (US); Tushar Agrawal, West Fargo, ND (US); Atul Mene, Morrisville, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 18/056,272

(22) Filed: Nov. 17, 2022

(65) Prior Publication Data
US 2024/0169081 A1    May 23, 2024

(51) Int. Cl.
*H04L 9/40*    (2022.01)
*G06F 21/62*    (2013.01)

(52) U.S. Cl.
CPC .......... *G06F 21/6218* (2013.01); *H04L 63/20* (2013.01)

(58) Field of Classification Search
CPC ........................................................ H04L 63/20
USPC .......................................................... 726/26
See application file for complete search history.

(56) References Cited

U.S. PATENT DOCUMENTS

| | | | |
|---|---|---|---|
| 10,574,670 B1 * | 2/2020 | Verma | H04W 12/72 |
| 10,791,063 B1 | 9/2020 | Florissi | |
| 10,986,496 B2 | 4/2021 | Bhardwaj | |
| 11,012,526 B1 | 5/2021 | Iynoolkhan | |
| 11,050,813 B2 | 6/2021 | Sabella | |
| 11,128,988 B2 | 9/2021 | Stammers | |
| 11,310,870 B2 | 4/2022 | Radmand | |
| 11,343,660 B2 | 5/2022 | Wang | |

(Continued)

FOREIGN PATENT DOCUMENTS

CN    106358245 B    12/2019

OTHER PUBLICATIONS

Alam et al., "Enabling Far-Edge Analytics: Performance profiling Of Frequent Pattern Mining Algorithms", IEEE Access, Special section on recent advances in cloud radio access networks, vol. 5, Jun. 7, 2017, pp. 1-14.

(Continued)

*Primary Examiner* — Hee Soo Kim
(74) *Attorney, Agent, or Firm* — Tihon Poltavets (57) ABSTRACT

A method for boundary based edge device compliance includes receiving a request to process data and identifying a cluster of edge devices to process the data located within a boundary area. The method includes applying compliance rules to the cluster of edge devices and instructing the cluster of edge devices to perform computations while adhering to the compliance rules associated with the boundary area. In response to determining that a first edge device from the (Continued)

cluster of edge devices is relocating outside of the boundary area, the method includes instructing the first edge device to transfer data to a second edge device from the cluster of edge devices prior to crossing the boundary to adhere to the compliance rules.

20 Claims, 3 Drawing Sheets

(56) References Cited

U.S. PATENT DOCUMENTS

| | | | |
|---|---|---|---|
| 2015/0245160 A1* | 8/2015 | Agrawal | H04L 41/145 455/406 |
| 2019/0140919 A1 | 5/2019 | Smith | |
| 2019/0230002 A1 | 7/2019 | Bernat | |
| 2021/0058489 A1 | 2/2021 | Kim | |
| 2021/0065566 A1 | 3/2021 | Li | |
| 2022/0109676 A1 | 4/2022 | Balmakhtar | |
| 2022/0150696 A1 | 5/2022 | Rajadurai | |
| 2022/0150816 A1 | 5/2022 | Albasheir | |
| 2023/0216890 A1* | 7/2023 | Kairali | H04L 63/20 726/1 |

OTHER PUBLICATIONS

Beck et al., "Privaros: A Framework For Privacy-Compliant Delivery Drones", arXiv:2002.06512v3 [cs.CR], Aug. 13, 2020, pp. 1-15.

Dautov et al., "Data Processing In Cyber-Physical-Social Systems Through Edge Computing", IEEE Access Special Section on cyber-physical-social computing and networking, Jun. 20, 2018, pp. 1-14.

Disclosed Anonymously, "Edge computing: Dynamic Priority-Based Device Selection, Reassignment and Rescheduling", IP.com: IPCOM000266589D, Jul. 30, 2021, pp. 1-5.

IBM, "Edge Computing Solutions", https://www.ibm.com/cloud/edge-computing, accessed Jul. 15, 2022, pp. 1-11.

IBM, "Governance, risk and compliance services", http://www.ibm.com/security/services/security-governance, accessed Jul. 15, 2022, pp. 1-6.

IBM, "IBM 5G and Edge computing", https://www.ibm.com/downloads/cas/0WOR6ORJ, accessed Jul. 15, 2022, pp. 1-24.

Moongilan, "5G Internet Of Things (IoT) Near And Far-Fields And Regulatory Compliance Intricacies", 2019 IEEE 5th World Forum on Internet of Things (WF-IoT), pp. 1-5.

Redhat, "Understanding Edge Computing", https://www.redhat.com/en/topics/edge-computing, Mar. 29, 2021, pp. 1-12.

STL Partners, "100 Edge Computing Companies to Watch in 2022", https://stlpartners.com/articles/edge-computing/edge-computing-compan . . . , accessed Jul. 15, 2022, pp. 1-49.

Zhang et al., Towards Privacy-Aware Task Allocation In Social Sensing Based Edge Computing Systems, IEEE, arXiv:2006.03178v1 [cs.DC], Jun. 5, 2020, pp. 1-17.

Unknown, "15 Edge computing companies to watch in 2020", Wayback Machine, retrieved from the Internet on Oct. 8, 2024, http://web.archive.org/web/20201101012159/https://stlpartners.com/edge-computing/edge-computing-companies-2020/.

* cited by examiner

BOUNDARY BASED EDGE DEVICE COMPLIANCE PROGRAM FOR MANAGING END USER DATA COMPLIANCE

BACKGROUND

This disclosure relates generally to edge devices, and in particular to boundary based edge device compliance in an edge computing environment.

Edge computing is a distributed information technology (IT) that relocates computational power, data storage, and resources closer to end users by utilizing endpoint devices located near the end users rather than a centralized and remote data center. Privacy and security schemes utilized in edge computing can vary depending on the data being handled by the edge devices. By minimizing the transmission of sensitive and private data to the centralized and remote data center, privacy and security is maintained locally on the edge device and ownership of the data shifts from to the end user rather than the service provided of the centralized and remote date center. To address privacy and security in the edge computing environment, different edge computing requirements for edge devices can require appropriate levels of compliance based on the data being handled from the end user.

SUMMARY

Embodiments in accordance with the present invention disclose a method, computer program product and computer system for boundary based edge device compliance, the method, computer program product and computer system can, responsive to receiving a request to process data utilizing a plurality of edge devices, identify a cluster of edge devices to process the data located within a boundary, wherein the boundary defines a boundary area. The method, computer program product and computer system can apply one or more compliance rules to the cluster of edge devices, wherein the one or more compliance rules are associated with the boundary area. The method, computer program product and computer system can instruct the cluster of edge devices to perform computations while adhering to the one or more compliance rules associated with the boundary area. The method, computer program product and computer system can, responsive to determining that a first edge device from the cluster of edge devices is relocating outside of the boundary area, instruct the first edge device to transfer data to a second edge device from the cluster of edge devices prior to crossing the boundary.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
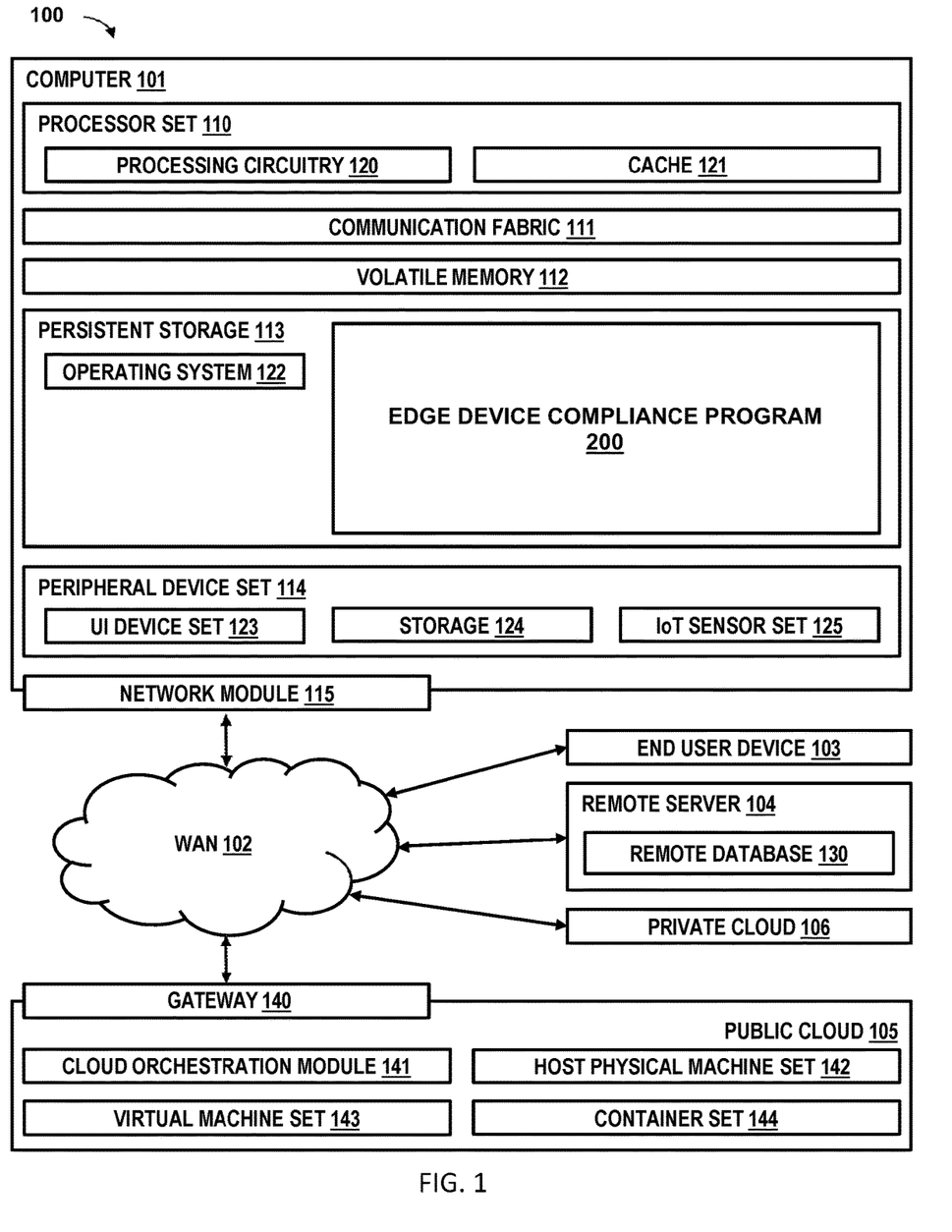
FIG. 1 is a functional block diagram illustrating a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as edge device compliance program 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
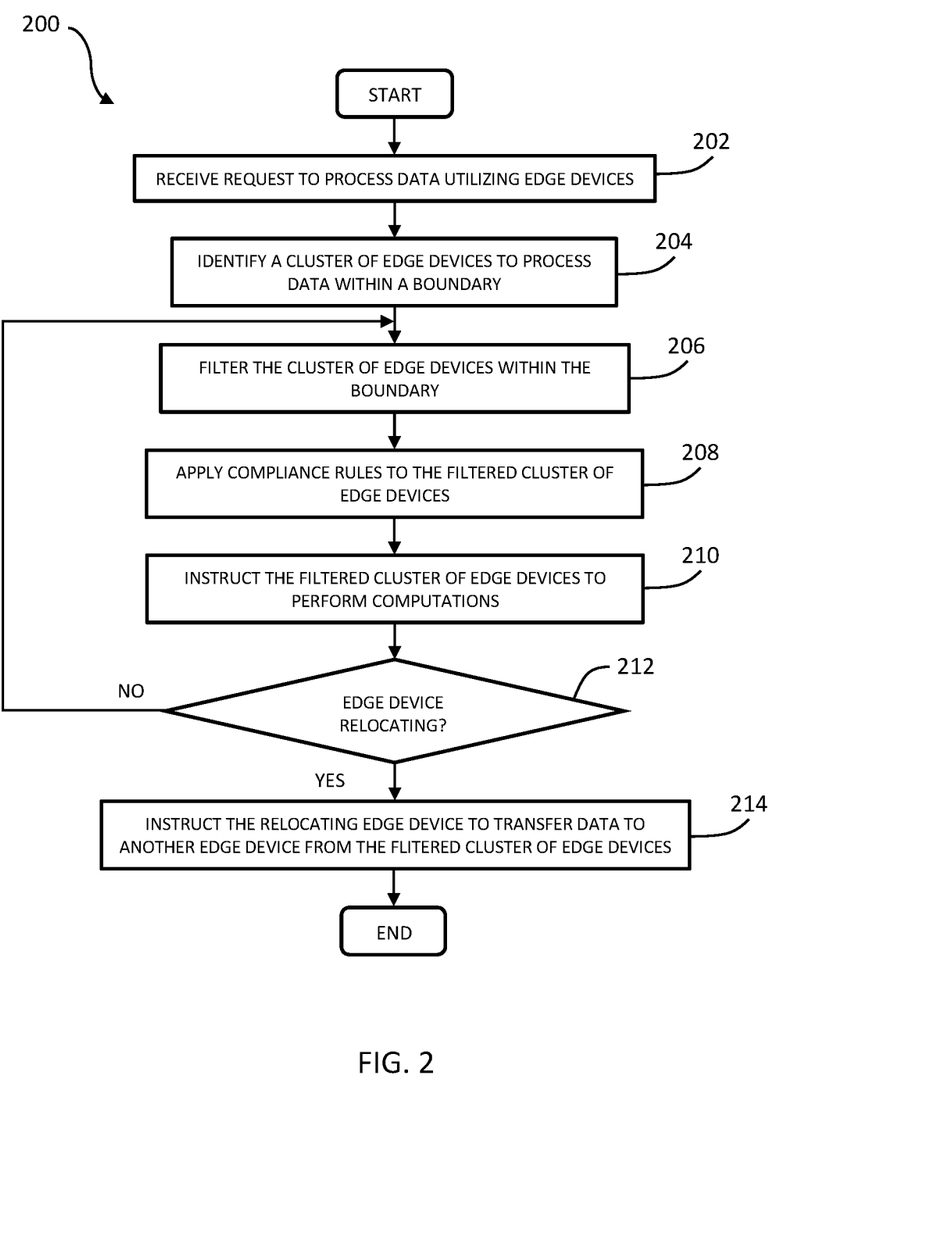
FIG. 2 depicts a flowchart of an edge device compliance program for managing end user data compliance in an edge computing environment, in accordance with an embodiment of the present invention.

FIG. 2 depicts a flowchart of an edge device compliance program for managing end user data compliance in an edge computing environment, in accordance with an embodiment of the present invention.

Edge device compliance program 200 receives a request to process data utilizing edge devices (202). To ensure rapid and secure processing, edge device compliance program 200 receives a request to process data utilizing edge devices via a local communications network compared to utilizing a remote server via a wider communication network. Edge device compliance program 200 utilizes baseline parameters to establish compliance rules for edge devices that are to process the data at a specific location. The baseline parameters can include but are not limited to minimal hardware specifications for the edge device, minimal security protocols and encryptions standards for the edge device, privacy specifications, and local regulations for a geographical area in which the boundary area is located. For the specific location, edge device compliance program 200 can utilize user or customer defined boundaries, a defined geographical area, and any interfering user or customer defined boundaries. Edge device compliance program 200 can receive the user or customer defined boundaries via a user or customer input that includes but is not limited to street names, radius distance from the specific location (e.g., 1000 feet), a perimeter surrounding a specific location (e.g., rectangular perimeter measuring 1 miles north and south from the specific location by 2 miles east and west from the specific location), an area surrounding the specific location (e.g., 4 square miles), and a structure (e.g., office building, warehouse). Edge device compliance program 200 can receive the defined geographical area via a user or customer input that includes but is not limited to known boundaries for private property associated with an address, a neighborhood, a town, a city, a state, and a country.

Edge device compliance program 200 can identify interfering user or customer boundaries based on multiple received user or customer defined boundaries discussed above. In one example, edge device compliance program 200 receives a first defined boundary area for customer A and a second defined boundary area for customer B, where a portion of the first defined boundary overlaps with the second defined boundary area. The first defined boundary area includes a first set of compliance rules for handling data for customer A and the second defined boundary area includes a second set of compliance rules for handling data for customer B. Edge device compliance program 200 can receive a customer defined parameter that prevents any overlapping boundary areas with another customer. In this example, edge device compliance program 200 receives the customer defined parameter from customer A specifying that the first defined boundary area should not overlap with another customer (i.e., customer B), so that an edge device handling data for customer A does not simultaneously handle data for the other customer. As a result, for customer A, edge device compliance program 200 determines to exclude the overlapping boundary areas with customer B, where the total boundary area for customer A is equal to the first defined boundary area for customer A minus the overlapping boundary area with customer B. In another example, edge device compliance program 200 receives a first defined boundary area for customer A and a second defined boundary area for customer B, where a portion of the first defined boundary overlaps with the second defined boundary area. The first defined boundary area includes a first set of compliance rules for handling data for customer A and the second defined boundary area includes a second set of compliance rules for handling data for customer B, where edge device compliance program 200 can handle data for both customer A and customer B in the overlapping boundary area. In this example, edge device compliance program 200 can apply compliance rules for customer A and customer B in the overlapping area, therefore edge device compliance program 200 does not need to modify the boundary areas for either of customer A or customer B.

In yet another example, edge device compliance program 200 receives a first defined boundary area for customer A and a second defined boundary area for customer B, where a portion of the first defined boundary area overlaps with the second defined boundary area. The first defined boundary area includes a first set of compliance rules for handling data for customer A and the second defined boundary area includes a second set of compliance rules for handling data for customer B, edge device compliance program 200 receives customer defined parameters from customer A that prevents any overlapping boundary areas with another customer (i.e., customer B). Prior to edge device compliance program 200 determining to exclude, for customer A, the overlapping boundary areas with customer B, edge device compliance program 200 determines a portion of the overlapping boundary area with customer B compared to the first defined boundary area for customer A. In the event edge device compliance program 200 determines the portion of the overlapping boundary area with customer B compared to the first defined boundary area for customer A is less than a specified percentage value (e.g., x<20%), event edge device compliance program 200 determines the total boundary area for customer A is equal to the first defined boundary area for customer A minus the overlapping boundary area with customer B. In the event edge device compliance program 200 determines the portion of the overlapping boundary area with customer B compared to the first defined boundary area for customer A is greater than or equal to a specified percentage value (e.g., x≥20%), edge device compliance program 200 determines to modify the first boundary area and the second boundary area. Edge device compliance program 200 can modify the first boundary area and the second boundary area such that an equal portion of the overlapping area for the first boundary area and the second boundary area is equally allocated to each of the first boundary area and the second boundary area. Edge device compliance program 200 can modify the second boundary area for customer B by reducing the total boundary area for customer B until the portion of the overlapping boundary area with customer B compared to the first defined boundary area for customer A is below a specified percentage value (e.g., x<20%).

Edge device compliance program 200 identifies a cluster of edge devices to process the data within a boundary (204). For the received request from a user or costumer to process data utilizing edge devices, edge compliance program 200 identifies the cluster of edge devices located within the boundary area defined by the user or customer and determines a current location for each edge device from the cluster of edge devices. Edge device compliance program 200 can categorize the cluster of edge devices into two types, stationary edge devices and mobile edge devices. For stationary edge devices, edge device compliance program 200 can query each of the edge devices within a boundary area defined by the user or customer to identify which of the edge device are active. For mobile edge devices, edge device compliance program 200 can query each of the edge devices currently located within a boundary area defined by the user or customer to identify which of the edge devices are active and identify whether any of the edge devices include a defined path of travel. The defined path of travel is commonly deployed for automated delivery devices, industrial devices on manufacturing and warehouse floors, and edge devices deployed with a homing beacon that prevents the edge devices from exceeding a radius or boundary as defined by the homing beacon. The defined path of travel allows for edge device compliance program 200 to utilizes the current location for the mobile device to determines when the mobile edge device is to leave the boundary area. Edge device compliance program 200 compiles the cluster of edge devices to process the data within a boundary area including stationary edge devices, mobile edge devices with a defined path of travel, and mobile edge devices without a defined path of travel.

Edge device compliance program 200 filters the cluster of edge devices within the boundary (206). Edge device compliance program 200 can filter the cluster of edge devices that includes the stationary edge devices, mobile edge devices with a defined path of travel, and mobile edge devices without a defined path of travel, within the boundary area utilizing the baseline parameters. As previously discussed with regards to (202), the baseline parameters can include but are not limited to minimal hardware specifications for the edge device, minimal security protocols and encryptions standards for the edge device, privacy specifications, and local regulations for a geographical area in which the request originated. Edge device compliance program 200 filters a list of the previously identified cluster of edge devices by removing a portion of the cluster of edge devices that fail to meet the baseline parameters, where removing the portion of the cluster of edge devices prevents edge device compliance program 200 from instructing the portion of the cluster of edge devices to perform computations per the received request to process data. For example, if an edge device does meet the minimal security protocols and encryptions standards from the baseline parameters, edge device compliance program 200 removes (i.e., filters) the edge device from the list of the previously identified cluster of edge devices. In another example, if an edge device does not meet minimal hardware specifications, edge device compliance program 200 removes (i.e., filters) the edge device from the list of the previously identified cluster of edge devices.

Edge device compliance program 200 can also filter the cluster of edge devices that includes the stationary edge devices, mobile edge devices with a defined path of travel, and mobile edge devices without a defined path of travel, within the boundary area by predicting edge device relocation. For stationary edge devices, edge device compliance program 200 determines each of the stationary edge devices are to remain at a single location and predicts each of the stationary edge devices will not relocate. Therefore, edge device compliance program 200 retains the stationary edge devices and does not filter the stationary edge devices from the cluster of edge devices. For mobile edge devices with a defined path of travel, edge device compliance program 200 determines whether the defined path of travel directs an edge device outside of the boundary area prior to being able to perform computations relating to the received data processing request from (202). In event edge device compliance program 200 determines the defined path of travel directs the edge device outside of the boundary area prior to being able to perform computations, edge device compliance program 200 removes the mobile edge device from the cluster of edge devices. In event edge device compliance program 200 determines the defined path of travel directs the edge device outside of the boundary area subsequent to being able to perform computations, edge device compliance program 200 retains the mobile edge device and does not filter the mobile edge device from the cluster of edge devices. For mobile edge devices without a defined path of travel, edge device compliance program 200 determines whether a current directional path of travel guides an edge device outside of the boundary area prior to being able to perform computations relating to the received data processing request from (202). In event edge device compliance program 200 determines the current directional path of travel guides the edge device outside of the boundary area prior to being able to perform computations, edge device compliance program 200 removes the mobile edge device from the cluster of edge devices. In event edge device compliance program 200 determines the current directional path of travel guides the edge device outside of the boundary area subsequent to being able to perform computations, edge device compliance program 200 retains the mobile edge device and does not filter the mobile edge device from the cluster of edge devices.

Edge device compliance program 200 applies compliance rules to the filtered cluster of edge devices (208). Edge device compliance program 200 applies the compliance rules to each edge device that includes the stationary edge devices, mobile edge devices with a defined path of travel, and mobile edge devices without a defined path of travel, from the filtered cluster of edge devices. As previously discussed, edge device compliance program 200 utilizes baseline parameters to establish compliance rules for edge device that are to process the data at a specific location. The baseline parameters include but are not limited to minimal hardware specifications for the edge device, minimal security protocols and encryptions standards for the edge device, privacy specifications, and local regulations for a geographical area in which the request originated. Since edge device compliance program 200 utilized the minimal hardware specifications and the minimal security protocols and encryptions standards to filter the cluster of edge devices, edge device compliance program 200 can apply compliance rules relating to the security protocols and encryptions standards, where each edge device from the filtered cluster of edge devices abides to the compliance rules for the security protocols and encryptions standards of handling user or client data. Edge device compliance program 200 can apply compliance rules relating to local regulations for a geographical area in which the request originated, where each edge device from the filtered cluster of edge devices abides to the compliance rules relating to local regulations for a geographical area in which the request originated. For example, if the request originated from a country in the European Union, edge device compliance program 200 ensures that the data being handled by each edge device from the filtered cluster of edge devices adheres to all user or customer privacy laws.

In other embodiments, edge device compliance program 200 applies additional compliance rules for each edge device from the filtered cluster of edge devices. In one example, edge device compliance program 200 applies a compliance rule to each edge device from the filtered cluster of edge devices requiring that data is deleted after processing, where no local copy of the data is stored on the edge device after processing. In another example, edge device compliance program 200 applies a compliance rule to each edge device from the filtered cluster of edge devices requiring that a splice of data is handled for a data set, rather than a smaller data set representing a portion of the data set. As a result, if a single edge device is compromised, the integrity of the data set is maintained, since a splice of data is compromised and not a complete smaller portion of the data from the whole data set. In yet another example, edge device compliance program 200 applies a compliance rule to each edge device from the filtered edge devices where each edge device is to remain in motion while performing computations for the data processing request. In yet another example, edge device compliance program 200 applies a compliance rule to each edge device from the filtered edge devices specifying time limits for how long data is to be locally stored. If a computation is not finished by the edge device prior to reaching a time limit, the edge device is to offload the data to another edge device from the filtered cluster of edge devices to complete the computation per the data processing request.

Edge device compliance program 200 instructs the filtered cluster of edge devices to perform computations (210). Edge device compliance program 200 instructs the filtered cluster of edge devices to perform computations by allocating portions of the data to each edge device from the filtered cluster of edge devices and instructing each edge device to perform edge computations on the allocated portion of data. Edge device compliance program 200 can allocate the data to each edge device based on availability, processing capabilities, an expected duration in the boundary area, a level of security protocols and encryptions, and/or a type of edge device. Edge device availability can represent an amount of processing availability if another computation is being performed by the edge device for another data processing request. Edge device availability can also represent an amount of time remaining to perform the computation remaining until the edge device goes offline due to, for example, expected maintenance and/or remaining battery life. Edge device processing capabilities represents hardware specification requirements for the edge device to perform computations per the data processing request. Edge device expected duration in the boundary area represents an amount of time a mobile edge device is to remain within the boundary area based on a defined path of travel. A level of security protocols and encryptions represents available software (e.g., encryption) and hardware (e.g., cryptographic Hardware Security Modules (HSM)) security capabilities of the edge device. A type of edge device can represent whether the edge device is stationary, mobile with a define path of travel, or mobile without a defined path of travel. A type of edge device can also represent whether the edge device is owned by the user and/or customer providing the data processing request, or the edge device is owned by another third party (e.g., another customer, a competitor, service provider).

In one example, edge device compliance program 200 instructs a first portion of edge devices from the filtered cluster of edge devices to perform computations on a first portion of a data set and instructs a second portion of edge devices from the filtered cluster of edge devices to perform computation on a second portion of the data set. The first portion of edge devices have a higher level of security protocols and encryption capabilities when compared to the second portion of edge devices. As result, edge device compliance program 200 allocates sensitive data (e.g., customer addresses, contact information) for processing to the first portion of edge devices and general data (e.g., items purchased, payment type) for processing to the second portion of edge device. Furthermore, in this example, edge device compliance program 200 utilizes data splicing techniques to ensure the data is not compromised if an edge device from the filtered cluster of edge devices becomes compromised. In another example, edge device compliance program 200 instructs a first edge device from the filtered cluster of edge devices to perform computations on a data set and excludes a second edge device from the filtered cluster of edge devices to perform computation on the data set. The first edge device is stationary and can perform computation without the need to offload the data to another edge device prior to completion. The second edge device is mobile with a defined path of travel, where an amount of time remaining in the boundary area is below a threshold level (e.g., x<5 min). Therefore, to avoid rapid offload of the data to another edge device prior to completion, edge device compliance program 200 excludes the second edge device from instructing to perform computation. Alternatively, the second edge device is mobile with a defined path of travel, where the second edge device can only perform a level of computation that is below a threshold level (e.g., x<25%), prior to leaving the boundary area.

Edge device compliance program 200 determines whether an edge device from the filtered cluster of edge devices is relocating outside the boundary (decision 212). In the event edge device compliance program 200 determines an edge device from the filtered cluster of edge devices is relocating outside the boundary ("yes" branch, decision 212), edge device compliance program 200 instructs the relocating edge device to transfer data to another edge device from the filtered cluster of edge devices (214). In the event edge device compliance program 200 determines an edge device from the filtered cluster of edge devices is not relocating outside the boundary ("no" branch, decision 212), edge device compliance program 200 reverts to filtering the cluster of edge devices within the boundary, where a new edge device may have crossed the boundary into the compliance area.

In one example, edge device compliance program 200 determines a mobile edge device from the filtered cluster of edge devices is relocating outside of the boundary area based on the defined path of travel for the mobile edge device. As previously discussed, edge device compliance program 200 can receive a current location for the mobile edge device and utilizes the defined path of travel to determine when the mobile device is to leave the boundary area. Edge device compliance program 200 can identify a distance and/or time remaining within the boundary area to ensure the mobile edge device leaving the boundary area can offload (i.e., transfer) the data to another edge device from the filtered cluster of edge devices remaining within the boundary area. In another example, edge device compliance program 200 determines an edge device from the filtered cluster of edge devices is relocating outside of the boundary area based on the edge device approaching a threshold line near a boundary perimeter for the boundary area. Crossing the threshold line located a set distance from the boundary perimeter for the boundary area indicates to edge device compliance program 200 that the edge device is relocating outside of the boundary area. In yet another example, edge device compliance program 200 determines an edge device from the filtered cluster of edge devices is relocating outside of the boundary area based on a scheduled maintenance for the edge device, where the edge device is to be removed from the boundary area for the scheduled maintenance.

Edge device compliance program 200 instructs the relocating edge device to transfer data to another edge device from the filtered cluster of edge devices (214). Edge device compliance program 200 instructs the relocating edge device to transfer any data associated with data processing request to another edge device from the filtered cluster of edge devices and instructs the relocating edge device to delete any local copy of contents associated with the data being transferred to the other edge device. Edge device compliance program 200 can transfer the data from the relocating edge device to another edge device from the filtered cluster of edge devices based on availability, processing capabilities, an expected duration in the boundary area, a level of security protocols and encryptions, and/or a type of edge device. In one example, edge device compliance program 200 identifies another edge device from the filtered cluster of edge devices to transfer the data from the relocating edge device based on proximity, where the other edge device from the filtered cluster of edge devices is located the shortest distance to the relocating edge device. In another example, edge device compliance program 200 identifies another edge device from the filtered cluster of edge devices to transfer the data from the relocating edge device based on availability. As previously discussed, edge device availability can represent an amount of processing availability if another computation is being performed by the edge device for another data processing request and can also represent an amount of time remaining to perform the transferred computation remaining until the edge device goes offline due to, for example, expected maintenance and/or remaining battery life. In some embodiments, edge device compliance program 200 can instruct multiple edge devices from the filtered cluster of edge devices to relocate towards the relocating edge device to ensure the transfer of the data to at least one other edge device from the multiple edge device is completed prior to the relocating edge device leaving the boundary area.

Figure 3:
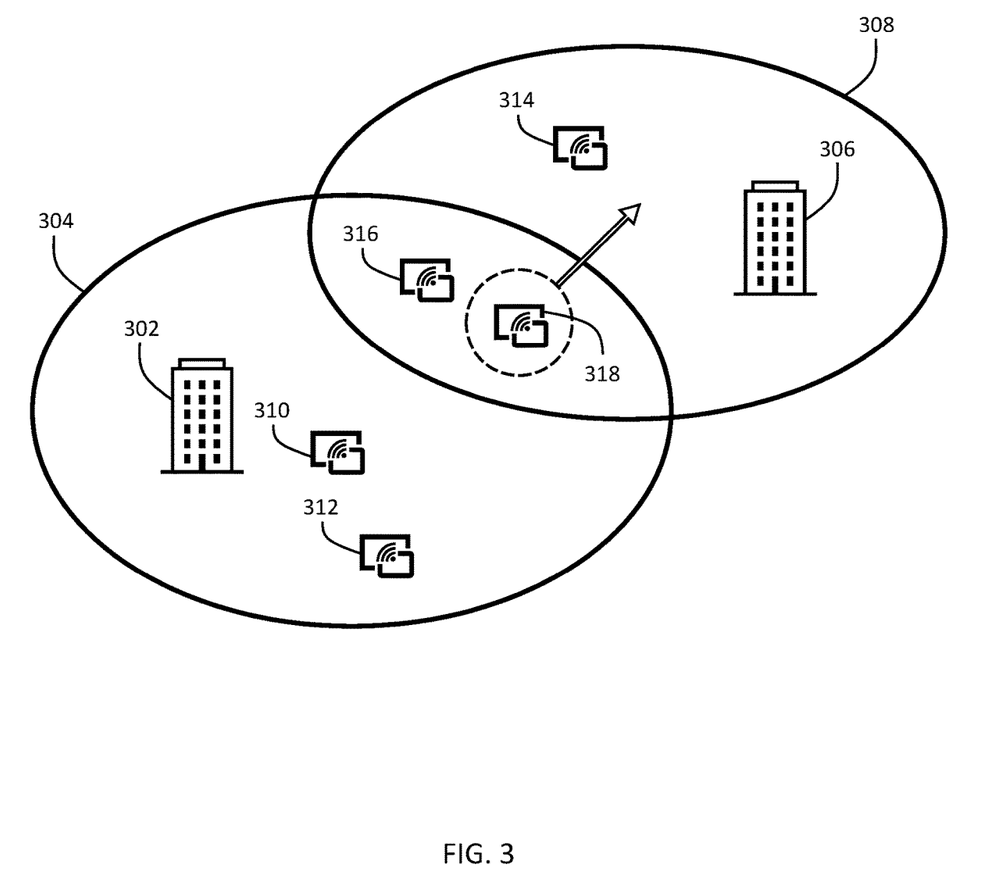
FIG. 3 depicts an illustrative example of an edge device compliance program managing end user data compliance in a multi-boundary edge computing environment, in accordance with an embodiment of the present invention.

FIG. 3 depicts an illustrative example of an edge device compliance program managing end user data compliance in a multi-boundary edge computing environment, in accordance with an embodiment of the present invention. In this example, fixed location 302 represents a laboratory at a university with a boundary area defined by perimeter 304. Fixed location 306 represent a headquarters for a technology firm with a boundary area defined by perimeter 308. The boundary area for fixed location 302 partially overlaps with the boundary area for fixed location 306, where perimeter 304 and perimeter 308 intersect at two points. Edge device 310 and 312 are positioned in the boundary area defined by perimeter 304, edge device 314 is positioned in the boundary area defined by perimeter 308, and edge device 316 and 318 are positioned in an overlapping boundary area defined by both perimeter 304 and 308. Edge device compliance program 200 ensures that edge device 310 and 312 adheres to end user data compliance rules as defined for the boundary area with perimeter 304. Edge device compliance program 200 also ensures that edge device 314 adheres to end user data compliance rules as defined for the boundary area with perimeter 308. Finally, edge device compliance program 200 ensures that edge device 316 and 318 adheres to end user data compliance rules as defined for an overlapping boundary area defined by perimeter 304 and 308. The end user data compliance rules for the boundary area with perimeter 304 are provided by the university operating the laboratory at fixed location 302 and the end user data compliance rules for the boundary area with perimeter 308 are provided by the technology firm with the headquarter at fixed location 306. In this embodiment, edge device compliance program 200 instructs edge device 316 and 318 to perform edge computations to two sets of end user data compliance rules. However, edge device compliance program 200 determines that edge device 318 is relocating from the overlapping boundary area to the boundary area only defined by perimeter 308. As a result, edge device compliance program 200 instructs the relocating edge device (i.e., edge device 318) to transfer to another edge device (i.e., edge device 316) that adheres to both sets of end user data compliance rules, prior to crossing perimeter 304 to leave the overlapping boundary area.

Embodiments of the present invention define edge device context by analyzing mobility parameters (e.g., speed and direction of movement etc.) of far edge devices (i.e., approaching a boundary) to determine a duration of availability of every edge device within a defined boundary area. Based on end user defined data compliance rules for the boundary area, embodiments of the present invention can instruct far edge devices to proactively transfer any edge computing load to nearby edge devices within the boundary to ensure the end user defined data compliance rules are maintained for the boundary area. Embodiments of the present invention can identify an amount of edge computing load for processing within a time frame by the far edge device based on estimated availability duration within the boundary area and an edge computing capacity for the far edge device, where prior to leaving the boundary area the far edge device can transfer the edge computing load to other edge devices within the boundary area. If a far edge device is participating in an edge computing environment where end user defined data compliance rules for the boundary area are present, embodiments of the present invention can adjust a speed and direction of the far edge device, so that additional time is provided to place additional edge devices remaining within the boundary area to receive the transferred computing load from the far edge device that is leaving the boundary area. Furthermore, the adjustment of the speed and the direction of the far edge device is based on an availability of the additional edge devices remaining within the boundary area.

Embodiments of the present invention can identify specification and criteria (e.g., defined policy requirements, encryption methods) for the end user defined data compliance rules within the boundary area in the edge computing environment and distribute the edge computing load to the available edge devices within the boundary are to ensure the specification and compliance criteria is maintained. A smart contract rule and ledger can be utilized to track how the edge computing loads are transferred between a far edge device and other additional edge devices within the boundary area to ensure the end user data compliance rules are maintained for all edge devices entering and leaving the boundary area. For instances where the far edge devices are present in the surrounding area, embodiments of the present invention can identify a portion of far edge devices that can maintain the criteria for the end user data compliance rules and can cluster the portion of the far edge devices to provide the edge computation support.

For each edge computing need, embodiments of the present invention utilize an end user data compliance rule. Different edge computing area can include different levels and types of compliance criteria. Each end user data compliance rule can be a location defined by a boundary range, such as, a laboratory, an office building, and a city. The end user data compliance rule can be defined based on policy requirements, where different edge computing needs can have different levels of policy requirements based on the data being handled. As a result, different edge devices can include different types of software to handles the various data with the different levels of policy requirements. Different edge devices can include different processing capability, such as, storage parameters and processing memory parameters. Embodiments of the present invention can track different edge device parameters such as, speed and direction of mobility and can publish the mobility parameters in a proactive manner to a cloud server. Based on the mobility parameters of the edge devices, embodiments of the present invention can identify how long each far edge device is expected to be available within any boundary area. Embodiments of the present invention can estimate an amount of edge processing to be performed within the available time and based on the amount of edge processing to be performed, can allocate an appropriate amount of edge devices.

Each edge computing requirement can include a defined location boundary, with geo-coordinates defining a boundary area.

Embodiments of the present invention can estimate different edge computing loads and can identify a portion of the edge computing load for assignment to any far edge devices approaching a boundary defining the boundary area. Embodiments of the present invention can identify the far edge devices and assign the portion of the edge computing load to the appropriate far edge devices. Utilizing a smart contract rule and a ledger to track how the edge computing load is distributed to different far edge devices, embodiments of the present invention can identify various load and movement patterns of the different far edge devices. Embodiments of the present invention can identify when a far edge device is about to leave the boundary area and as per the end user data compliance rules, can identify the data that should not be moved outside of the defined boundary area. Embodiments of the present invention can identify an additional edge device to which the computing load can be transferred from the far edge device that leaving the boundary area. Based on the location boundary range, embodiments of the present invention can proactively arrange multiple additional edge devices to receive the edge computing load before the far edge device crosses the boundary and leaves the boundary area. In the event no alternate far edge device is available to receive the transferred edge computing load, embodiments of the present invention can control the far edge device to adjust a speed and/or direction of movement, so that edge computing load can be transferred to the additional edge device prior to crossing the boundary and leaving the boundary area. Embodiments of the present invention utilizes the previously mentioned ledger to track if the end user data compliance rule is maintained while the far edge devices perform the edge computations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    responsive to receiving a request to process data utilizing a plurality of edge devices, identifying a cluster of edge devices to process the data located within a boundary, wherein the boundary defines a boundary area;
    applying one or more compliance rules to the cluster of edge devices, wherein the one or more compliance rules are associated with the boundary area;
    instructing the cluster of edge devices to perform computations while adhering to the one or more compliance rules associated with the boundary area; and
    responsive to determining that a first edge device from the cluster of edge devices is relocating outside of the boundary area, instructing the first edge device to transfer data to a second edge device from the cluster of edge devices prior to crossing the boundary to adhere to the one or more compliance rules.

2. The computer-implemented method of claim 1, further comprising:
    filtering the cluster of edge devices within the boundary based on baseline parameters, wherein the baseline parameters are selected from a group consisting of: minimal hardware specifications, minimal security protocols and encryptions standards, one or more privacy specifications, and one or more local regulations for a geographical area in which the boundary area is located.

3. The computer-implemented method of claim 2, wherein the baseline parameters are associated with the request to process data utilizing the plurality of edge devices.

4. The computer-implemented method of claim 1, further comprising:
    determining whether the first edge device form the cluster of edge devices is relocating outside of the boundary area based on a defined path of travel for the first edge device.

5. The computer-implemented method of claim 1, further comprising:
    determining whether the first edge device form the cluster of edge devices is relocating outside of the boundary area based on the first edge device approaching a threshold line near a boundary perimeter for the boundary area.

6. The computer-implemented method of claim 1, wherein instructing the first edge device to transfer data to the second edge device from the cluster of edge devices prior to crossing the boundary is based on at least one of: availability, processing capabilities, an expected duration in the boundary area, a level of security protocols and encryptions, and a type of edge device.

7. The computer-implemented method of claim 1, further comprising:
    instructing a portion of the cluster of edge devices that includes the second edge device to relocate towards the first edge device.

8. A computer program product comprising:
    one or more computer-readable storage media and program instructions stored on the one or more computer-readable storage media capable of performing a method, the method comprising:
    responsive to receiving a request to process data utilizing a plurality of edge devices, identifying a cluster of edge devices to process the data located within a boundary, wherein the boundary defines a boundary area;
    applying one or more compliance rules to the cluster of edge devices, wherein the one or more compliance rules are associated with the boundary area;
    instructing the cluster of edge devices to perform computations while adhering to the one or more compliance rules associated with the boundary area; and
    responsive to determining that a first edge device from the cluster of edge devices is relocating outside of the boundary area, instructing the first edge device to transfer data to a second edge device from the cluster of edge devices prior to crossing the boundary to adhere to the one or more compliance rules.

9. The computer program product of claim 8, further comprising:
    filtering the cluster of edge devices within the boundary based on baseline parameters, wherein the baseline parameters are selected from a group consisting of: minimal hardware specifications, minimal security protocols and encryptions standards, one or more privacy specifications, and one or more local regulations for a geographical area in which the boundary area is located.

10. The computer program product of claim 9, wherein the baseline parameters are associated with the request to process data utilizing the plurality of edge devices.

11. The computer program product of claim 8, further comprising:
determining whether the first edge device form the cluster of edge devices is relocating outside of the boundary area based on a defined path of travel for the first edge device.

12. The computer program product of claim 8, further comprising:
determining whether the first edge device form the cluster of edge devices is relocating outside of the boundary area based on the first edge device approaching a threshold line near a boundary perimeter for the boundary area.

13. The computer program product of claim 8, wherein instructing the first edge device to transfer data to the second edge device from the cluster of edge devices prior to crossing the boundary is based on at least one of: availability, processing capabilities, an expected duration in the boundary area, a level of security protocols and encryptions, and a type of edge device.

14. The computer program product of claim 8, further comprising:
instructing a portion of the cluster of edge devices that includes the second edge device to relocate towards the first edge device.

15. A computer system comprising:
one or more computer processors, one or more computer-readable storage media, and program instructions stored on the one or more of the computer-readable storage media for execution by at least one of the one or more processors capable of performing a method, the method comprising:
responsive to receiving a request to process data utilizing a plurality of edge devices, identifying a cluster of edge devices to process the data located within a boundary, wherein the boundary defines a boundary area;
applying one or more compliance rules to the cluster of edge devices, wherein the one or more compliance rules are associated with the boundary area;
instructing the cluster of edge devices to perform computations while adhering to the one or more compliance rules associated with the boundary area; and
responsive to determining that a first edge device from the cluster of edge devices is relocating outside of the boundary area, instructing the first edge device to transfer data to a second edge device from the cluster of edge devices prior to crossing the boundary to adhere to the one or more compliance rules.

16. The computer system of claim 15, further comprising:
filtering the cluster of edge devices within the boundary based on baseline parameters, wherein the baseline parameters are selected from a group consisting of: minimal hardware specifications, minimal security protocols and encryptions standards, one or more privacy specifications, and one or more local regulations for a geographical area in which the boundary area is located.

17. The computer system of claim 16, wherein the baseline parameters are associated with the request to process data utilizing the plurality of edge devices.

18. The computer system of claim 15, further comprising:
determining whether the first edge device form the cluster of edge devices is relocating outside of the boundary area based on a defined path of travel for the first edge device.

19. The computer system of claim 15, further comprising:
determining whether the first edge device form the cluster of edge devices is relocating outside of the boundary area based on the first edge device approaching a threshold line near a boundary perimeter for the boundary area.

20. The computer system of claim 15, wherein instructing the first edge device to transfer data to the second edge device from the cluster of edge devices prior to crossing the boundary is based on at least one of: availability, processing capabilities, an expected duration in the boundary area, a level of security protocols and encryptions, and a type of edge device.

* * * * *